US008335534B2

(12) United States Patent
Zhang et al.

(10) Patent No.: US 8,335,534 B2
(45) Date of Patent: Dec. 18, 2012

(54) DISTRIBUTED INTER-CELL INTERFERENCE MITIGATION IN OFDMA MULTI-CARRIER WIRELESS DATA NETWORKS

(75) Inventors: Hoonghai Zhang, Ewing, NJ (US); Sampath Rangarajan, Bridgewater, NJ (US); Luca Venturino, Cassino (IT); Narayan Prasad, Monmouth Junction, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 946 days.

(21) Appl. No.: 12/388,428

(22) Filed: Feb. 18, 2009

(65) Prior Publication Data
US 2010/0009710 A1 Jan. 14, 2010

Related U.S. Application Data

(60) Provisional application No. 61/079,489, filed on Jul. 10, 2008.

(51) Int. Cl.
*H04B 7/00* (2006.01)
(52) U.S. Cl. ........................................ 455/522; 455/63.1
(58) Field of Classification Search .................. 455/501, 455/69, 522; 370/201, 203
See application file for complete search history.

(56) References Cited

U.S. PATENT DOCUMENTS
2009/0291699 A1* 11/2009 Heath et al. ................... 455/501

OTHER PUBLICATIONS

S. Das and H. Viswanathan, "Interference mitigation through interference avoidance," in *Proc. of the Asilomar Conference on Signal and Systems*, Asilomar, CA, Nov. 2006.
M. Karakayali, G. Foschini, and R. Valenzuela, "Network coordination for spectrally efficient communications in cellular systems," *IEEE Wireless Communications Magazine*, vol. 13, No. 4, pp. 56-61, Aug. 2006.
S. Das, H. Viswanathan, and G. Rittenhouse, "Dynamic load balancing through coordinated scheduling in packet data systems," in *Proc. of the 2003 IEEE International Conference on Computer Communications (INFOCOM)*, San Francisco, CA, Mar. 2003.
A. Gjendemsjø, G. ØBien, and D. Gesbert, "Binary power control for multi-cell capacity maximization," in *Proc. of the 2007 IEEE Workshop on Signal Processing Advances in Wireless Communications (SPAWC)*, Helsinki, Finland, Jun. 2007.
A. Gjendemsjø, D. Gesbert, G. ØBien, and S. Kiani, "Binary power control for sum rate maximization over multiple interfering links," *IEEE Transactions on Wireless Communications*, vol. 7, No. 8, pp. 3164-3173, 2008.

* cited by examiner

*Primary Examiner* — Tu X Nguyen
(74) *Attorney, Agent, or Firm* — Bao Tran; Joseph Kolodka

(57) ABSTRACT

Systems and methods are disclosed for transmission with a plurality of base stations (BSs) in a wireless cellular data network where one BS communicates with neighboring BSs by determining a binary or discrete new power level on each subchannel to determine a weighted sum modified rates of a BS and in-neighbor BSs; and resolving concurrent power update in each BS in a distributed manner.

28 Claims, 13 Drawing Sheets

(a) Achieved throughput (b) Relative performance improvement compared to PFS (a) Average user rate (b) Average actual number of reported interfering BS's (a) Average user rate  (b) Average actual number of reported interfering BS's (a) Average throughput improvement over the PFS scheme  (b) Average time to converge

DISTRIBUTED INTER-CELL INTERFERENCE MITIGATION IN OFDMA MULTI-CARRIER WIRELESS DATA NETWORKS

This application claims priority to Provisional Application Ser. No. 61/079,489 filed Jul. 10, 2008, the content of which is incorporated by reference.

BACKGROUND

3G/4G wireless systems are characterized by high-speed downlink and uplink data services. In such systems, interference between different cells is an important issue. Fractional frequency reuse is a traditional (even though suboptimal) approach to multi-cell interference mitigation. For example, in a ⅓ fractional frequency reuse system, only ⅓ of the frequency band is allocated to each cell/sector. Static fractional frequency planning reduces interference and, hence, improves coverage at the price of reducing the total system throughput per unit of frequency resources (i.e., Hz), compared to the full frequency re-use scheme. In addition, frequency diversity and multi-cell diversity cannot be fully exploited.

Recently, base station (BS) coordination has emerged as a promising tool for inter-cell interference mitigation. If neighboring base stations can communicate through high-speed wireline links, they can jointly decide what power level each base station should choose on each frequency band in order to improve the network weighted sum-rate. Previous work in this area typically relies on centralized or semi-centralized optimization process. Some distributed schemes also exist for interference mitigation. However, one scheme can only be employed to maximize the total throughput and cannot be generalized to the weighted sum-rate case. Another process assumes that power is a continuous variable and requires the channel gain from all other BSs to the selected user in each BS, and thus requires more communication overhead. Yet another scheme employs simulated annealing to optimize the system throughput. While simulated annealing can guarantee the asymptotic optimality, it is at the price of infinitely-long convergence time. Other works have focused on distributed processes for fixed-bit-rate traffic that do not exploit multi-channel selectivity.

SUMMARY

Systems and methods are disclosed for transmission with a plurality of base stations (BSs) in a wireless cellular data network where one BS communicates with neighboring BSs to determine a binary or discrete new power level on each subchannel to maximize a weighted sum rates of a BS and in-neighbor BSs; and to resolve concurrent power update in each BS in a distributed manner.

Advantages of the embodiments may include one or more of the following. The schemes are distributed, provide proportional fairness, require less overhead, and obtain higher throughput than conventional schemes. In resolving the concurrent power update, the system spreads the processing workload associated with the power update processing tasks to all BSes and each BS performs the concurrent power update as part of the group. For example, in each iteration n, each BS decides its new transmission power on each subchannel in order to maximize the weighted sum of the modified rates and the summation is taken over itself and the set of in-neighbors.

The system advantageously performs inter-cell interference mitigation in wireless cellular data networks. The processes guarantee convergence to a state where no base station can change its status to improve the system weighted throughput (given the status of the other base stations). When base stations can communicate with their neighboring base stations, the system optimizes the network weighted sum-rate via cooperative power control. The weights account for different priorities of the mobile terminals, and can be periodically updated to maintain proportional fairness. Two distributed embodiments can be used for inter-cell coordination which converge to a state where no base station can change its status to improve the weighted throughput of the network. Numerical results show that these process achieve a significant rate gain, especially for cell-edge users (about 20%), compared to a conventional proportional fair scheduling process without inter-cell coordination. The distributed processes require limited feedback and achieve most of the performance gain within few iterations.

DESCRIPTION

Figure 1A:
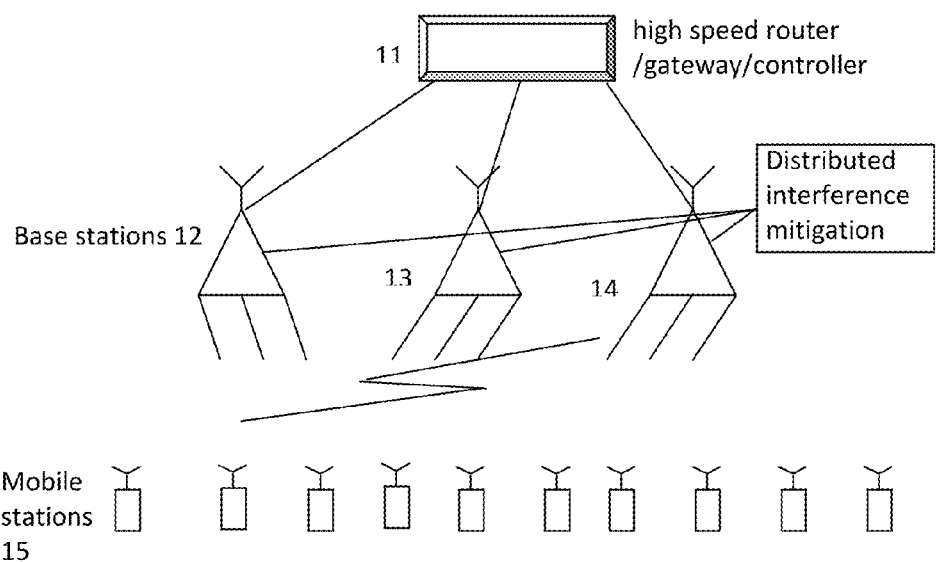
FIG. 1A shows an exemplary wireless system in accordance with one aspect of the present invention.

FIG. 1A shows an exemplary wireless system in accordance with one aspect of the present invention. In FIG. 1A, mobile users (block 15) are served by multiple BSs (blocks 12, 13, 14) on multiple sub-channels, which are connected via high-speed router, gateway or controller (block 11). The proposed schemes reside in the base stations (blocks 12, 13, 14) and are designed to mitigate interference among different BSs. The system maximizes a weighted sum rate of each link, where the rate of each link is defined to be $r=\log_2(1+SINR/\Gamma)$, where $\Gamma$ represents the gap between practical coding schemes and the Shannon capacity.

In the system of FIG. 1A, each sub-channel has a subset of power levels with which a BS can choose to transmit and the subset of power levels for different sub-channel in each BS may be different. The subset of power levels includes zero, which indicates that BS may choose not to transmit on that sub-channel. If the subset of power levels only contains a zero, the BS cannot transmit on that sub-channel (this corresponds to the sub-channels not assigned to the BS for ⅓ frequency reuse). In the discussion below, "subchannel" should be viewed as the minimum allocation block in the frequency domain. For example, in some systems such as LTE, RB (resource block) is the minimum frequency allocation unit, so "subchannel" should be viewed as RB in those systems.

The system of FIG. 1A provides distributed interference mitigation in OFDMA-based cellular networks. There are M base stations transmitting to a set of N wireless users on a set of C subchannels. Each user chooses a base station based only on the long-term average signal strength. Each base station can transmit on each subchannel with multiple discrete power levels, namely, $a_0 P, a_1 P_0, \ldots, a_K P_0$, where $0 = a_0 < \ldots < a_K \leq 1$. Note that the elements in the set $\{a_0, \ldots, a_K\}$ as well as its cardinality can be dependent on the BS and the sub-channel. For convenience, the dependence is not explicitly denoted.

The maximum power $a_K P_0$ that can be used on a sub-channel by a BS can be determined using any suitable slow power-control algorithm. The number of power levels allowed for a BS on a sub-channel is constrained by the complexity and latency constraints as well as the limit imposed on the signaling overhead. A suitable $P_0$ as well as $\{a_0, \ldots a_K\}$ is determined for each sub-channel and BS.

The data rate on subchannel c from BS b to user j can be modeled by the Shannon's formula if it is active on subchannel c:

$$r_{bjc} = \log\left(1 + \frac{SINR_{bjc}}{\Gamma}\right), \quad (1)$$

where $\Gamma$ represents the gap between the practical coding schemes and the Shannon capacity, and $SINR_{bjc}$ is the signal-to-interference-plus-noise ratio (SINR) defined as $$SINR_{bjc} = \frac{P_0 \chi_{bc} G_{bjc}}{N_0 + \sum_{s \neq b} P_0 \chi_{sc} G_{sjc}}. \quad (2)$$

In Eq. (2), $\chi_{bc}$ is the power boosting function which takes value on the discrete set $\{a_0, a_1, \ldots a_K\}$, $G_{bjc}$ is the channel gain (including antenna gain, path loss, shadowing and fast fading) from BS b to user j on subchannel c, $N_0/2$ is the power spectral density of thermal noise.

The system maximizes the weighted sum-rate in each time slot:

$$\max \sum_{b,c} w_j r_{bjc}, \quad (3)$$

where the controlling parameters are the power boosting functions $\chi_{bc}$ and the user assignment function $j=j(b,c)$ for $b=1, \ldots, M$ and $c=1, \ldots, C$. The user weight $w_j$ can change over time. For example, in the proportional fair scheduling method, $w_j = 1/\hat{r}_j$ where $\hat{r}_j$ is the average throughput achieved by user j.

The following notations are defined for subsequent references. The Interference and Noise to Signal Ratio (INSR) is defined as $$INSR_{bjc} = \frac{N_0}{P_0 G_{bjc}} + \sum_{s \neq b} \chi_{sc} \frac{G_{sjc}}{G_{bjc}}, \quad (4)$$

and individual ISR is defined as $$ISR_{sbjc} = \frac{G_{sjc}}{G_{bjc}}.$$

The set of out-neighbor of a BS b on subchannel c, denoted as $NB_{out}(b,c)$, consists of up to K BSs with the highest interference such that $ISR_{sbjc} \geq \beta$, where s is the candidate out-neighbor BS and $j=j(b,c)$ is the user selected by BS b on subchannel c. If BS b is an out-neighbor of BS s on a sub-channel, BS s is called an in-neighbor of BS b on the same subchannel. In other words, the set of in-neighbor of BS b on subchannel c, $NB_{in}(b,c)$ is defined as $NB_{in}(b,c) = \{s: b \in NB_{out}(s,c)\}$. The two-hop neighbor set of b, is defined as $$NB2(b) = \{s: \text{there exists a subchannel } c \text{ such that } NB_{in}(b,c) \cap NB_{in}(s,c) \neq \phi\}. \quad (5)$$

Figure 1B:
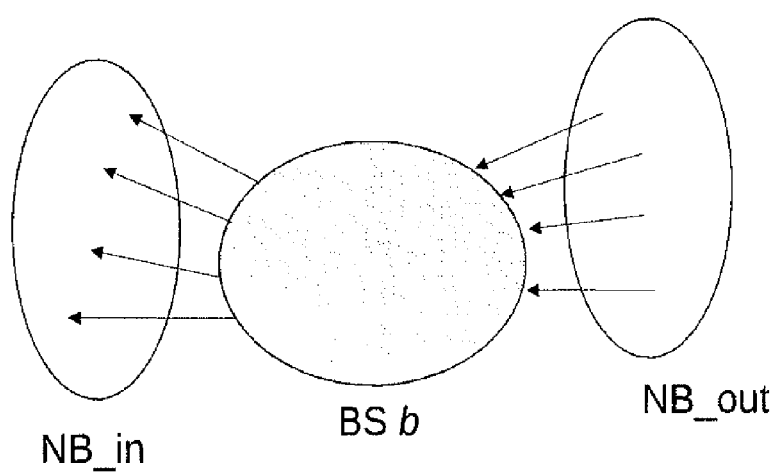
FIG. 1B shows the relationship between a BS b and its in-neighbor and out-neighbor set.

FIG. 1B shows the relationship between a BS b and its in-neighbor and out-neighbor set. As shown in FIG. 1B, $NB_{out}(b,c)$ is the set of BSs that create strong interference to BS b on subchannel c, and $NB_{in}(b,c)$ is the set of BSs that was strongly interfered by BS b on subchannel c. In our algorithms, each BS b only keeps track of the status of its out-neighbors. Therefore, it can only compute its modified rate $\bar{r}_{bjc}$ on each subchannel c by assuming that those BSs that are not in $NB_{in}(b,c)$ are transmiting using full power:

$$\bar{r}_{bjc} = \log_2\left(1 + \frac{\chi_{b,c}}{\Gamma \cdot \overline{INSR}_{bjc}}\right) \quad (6)$$

where $\overline{INSR}_{bjc}$ is the modified interference and noise to signal ratio defined as $$\overline{INSR}_{bjc} = \frac{N_0}{P_0 G_{bjc}} + \sum_{\substack{s \neq b, \\ s \notin NB_{out}(b,c)}} \frac{G_{sjc}}{G_{bjc}} + \sum_{s \in NB_{out}(b,c)} \chi_{sc} \frac{G_{sjc}}{G_{bjc}}. \quad (7)$$

The system of FIG. 1A provides distributed inter-cell mitigation via coordinated power control in OFDMA-based multi-carrier systems. The system maximizes the weighted sum-rate where the weights account for different priority of mobile users and can be dynamically updated to maintain user fairness. The system employs a discrete power control model wherein each BS can transmit using one of the multiple power levels.

FIG. 1B shows the relationship between a BS b and its in-neighbor and out-neighbor set. NB_out(b) is the set of BSs that create strong interference to BS b, NB_in is the set of BSs that are strongly interfered by BS b. As discussed in more details below, a basic scheme embodiment can be used to provide distributed inter-cell interference mitigation, and this basic scheme can be enhanced with a prioritized scheme embodiment, a randomized scheme embodiment, and/or enhanced scheme embodiments. The basic scheme aims at reducing the interference without considering the issue of concurrent updates. It is a basic foundational block in which the prioritized and the randomized schemes can be added.

One issue in any distributed power control problem is the concurrent update of the status of each BS. For example, if two neighboring BSs are interfering with each other, they may simultaneously decide to switch off: in this case, no rate improvement is achieved. To circumvent this drawback, two embodiments are provided: Prioritized embodiment and Randomized embodiment. The Prioritized embodiment requires that during each time slot no two base stations that are two-hop neighbors (as defined in Eq. (5)) be allowed to change their status simultaneously. In the Randomized embodiment, each base station is allowed to change its status with certain transition probability. The Prioritized scheme converges within finite iterations and the Randomized scheme converges with probability one to a state where no BS can change its status to improve the weighted sum modified rate. While multi-carrier systems are discussed herein, single-carrier systems can also benefit from the present solution by considering only one subchannel. Binary power control is a special case of the embodiment with multiple discrete power levels.

The prioritized scheme and the randomized scheme solve the issue of concurrent updates and make use of the basic scheme. Enhanced schemes are provided to further improve the performance and can be applied to either the prioritized or the randomized scheme. Numerical results show that the proposed distributed processes achieve a significant rate gain over a conventional proportional fair scheduling process without inter-cell cooperation; in particular, the total system throughput using binary power control is improved by about 5%, while the throughput improvement for cell-edge users using binary power control is about 20%. The distributed process can even outperform previously proposed centralized strategies. In addition, the Randomized embodiment converges very fast, achieving most of the aforementioned rate gain within two iterations. Finally, both embodiments require a small amount of feedback. Providing information for the two strongest interfering BSs on each subchannel is sufficient to achieve most of the performance gain.

Figure 2:
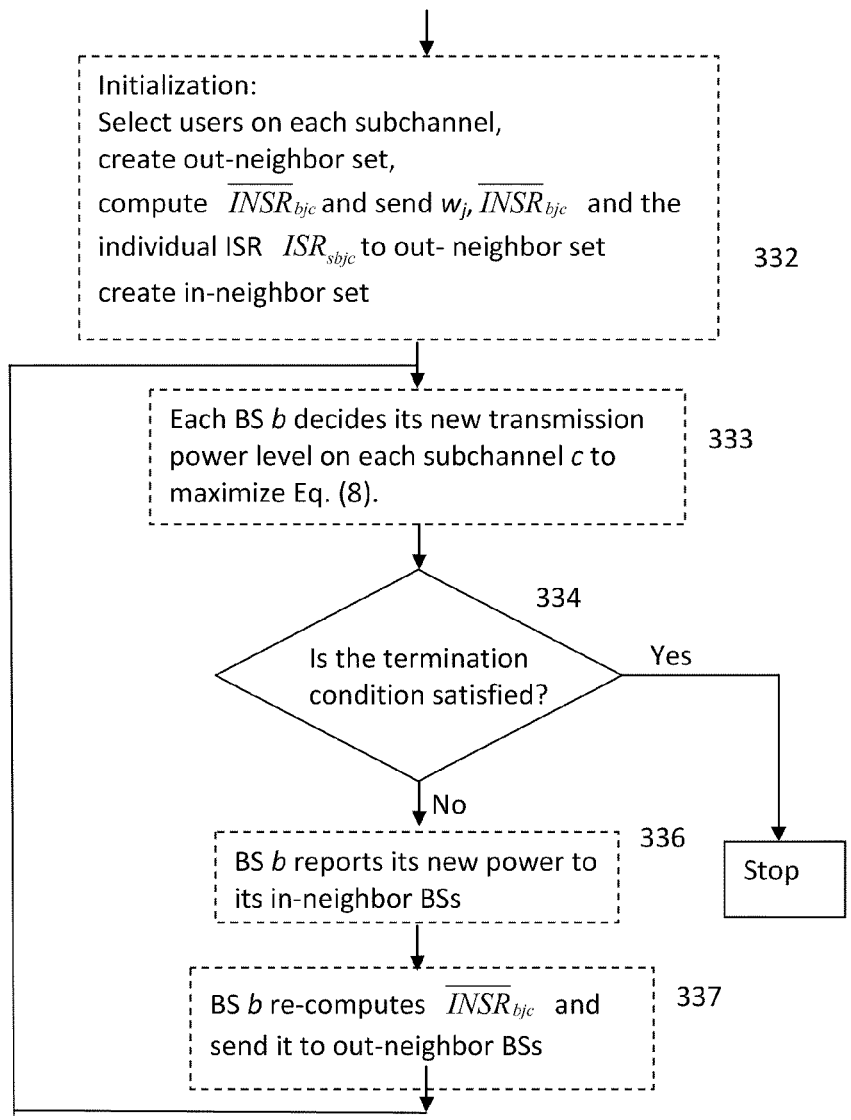
FIG. 2 shows an exemplary process for handling the basic scheme of interference mitigation with discrete power levels.

FIG. 2 shows an exemplary process for handling the basic scheme of interference mitigation with multiple discrete power levels. First, the process performs initialization. Initially, each BS b assumes that all BS transmit using maximum power $a_k P_0$ on each subchannel, and selects on each subchannel c the user j=j(b,c) that maximizes the weighted rate $w_j r_{bjc}$. Based on the interference information from the selected user, each BS b computes its out-neighbor set $NB_{out}(b,c)$ on each subchannel and sends a message containing the following information to its out-neighbors (block 332):

i) The weight of selected user j on each subchannel,
ii) its modified INSR $\overline{INSR}_{bjc}$ on each subchannel c,
iii) the individual ISR $ISR_{b'bjc}$ for each selected out-neighbor on each subchannel c.

When a BS receives all such messages from its neighbors, it can construct its in-neighbor set $NB_{in}(b,c)$ on each subchannel c. Note that the in-neighbor sets and out-neighbor sets can be made static and semi-static in order to reduce the initial message exchange.

After initialization, the process runs iteratively to update the power status of each BS (Blocks 333-337). In each iteration n, each BS b decides its new transmission power on each subchannel c in order to maximize the weighted sum of the modified rates and the summation is taken over itself and the set of in-neighbors. In order words, the power boosting level $\chi_{bc}$ of BS b on subchannel c is chosen to maximize $$\sum_{s \in \{b\} \cup NB_{in}(b,c)} w_{j(s,c)} \bar{r}_{sj(s,c)c} = w_{j(b,c)} \log_2\left(1 + \frac{\chi_{bc}}{\Gamma \overline{INSR}_{bjc}}\right) + \qquad (8)$$

$$\sum_{s \in NB_{in}(b,c)} w_{j(s,c)} \log_2\left(1 + \frac{\chi_{s,c}^{(n-1)}/\Gamma}{\overline{INSR}_{sj(s,c)c} + ISR_{bsjc}(\chi_{bc} - \chi_{bc}^{(n-1)})}\right)$$

where $\chi_{bc}^{(n-1)}$ is the power status in the previous iteration n−1.

Each BS b will then inform its in-neighbors about its new power boosting levels $\chi_{bc}$ and re-computes its updated interference and noise to power ratio $\overline{INSR}_{bj(b,c)c}$ on each subchannel c and sends to its out-neighbors (336-337).

The process terminates when no BS can improve the weighted sum rate as defined in Eq. (8) or a maximum number of iterations is reached.

The system of FIG. 2 handles distributed interference mitigation in multi-cell networks. For each subchannel, there is a (possibly different) subset of power levels with which a BS can choose to transmit. The subset of power levels for a subchannel at a particular BS can contain a single positive value (in which case, the BS can only transmit with a fixed power specified by the single positive power level in the subset). The subset of power level normally contains a value 0 which, if selected, indicates that the BS does not transmit on the given subchannel.

One issue with the above basic scheme is the concurrent update if every BS updates its status without considering that other BSs may also change their status simultaneously. For example, assume that there are only M=2 base stations and one subchannel. If they interfere with each other and both decide to switch off, then the system gets a total rate 0. At the next iteration, both of them will decide to be active. As a result, the process will never stop. To resolve this issue, two approaches are described next.

In one embodiment referred to as the Prioritized scheme, a limitation is imposed that no two neighbor BSs which are two-hop neighbors (as defined in Eq. (5)) can update their power status at a time. To this end, the system assigns a priority and a time-stamp to each BS. To reduce overhead, the priority and time-stamp are assumed to be common to all subchannels at each base station. The priority of each base station is generated either randomly or using some system parameters (such as the total queue length or the total achieved rate). The system also assumes that all BSs receive a different priority. The time-stamp of each BS is set to zero initially. At each iteration, every BS b still computes the new $\overline{INSR}_{bjc}$ defined in Eq. (7) and sends it to all out-neighbors. Next it checks its time stamp and priority; if all two-hop neighbors have either a larger time stamp or the same time stamp but lower priority, BS b runs the remaining part of the iteration (i.e., computing its new power status to maximize the weighted sum rate in Eq. (8), notifying its in-neighbors about its status change, and notifying its out-neighbors about its INSR values). Then the BS b increments its time-stamp and reports the new time-stamp to its two-hop neighbors.

Figure 3A:
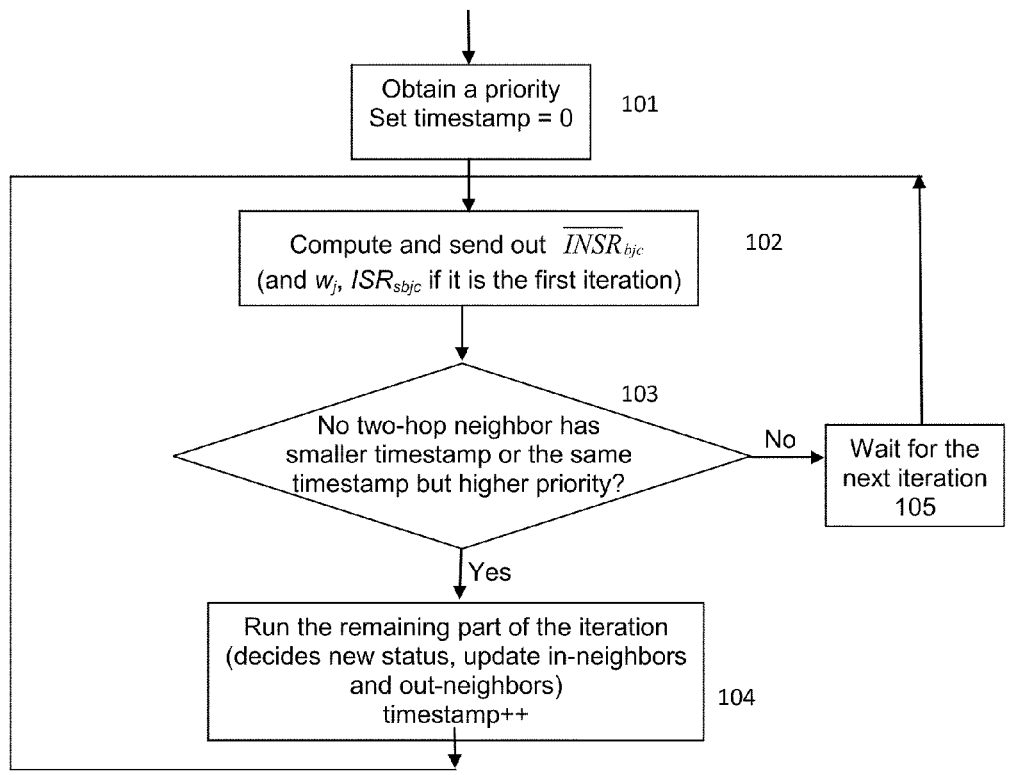
FIGS. 3A-3B shows exemplary processes for performing Prioritized interference mitigation.

FIG. 3A shows one exemplary process for performing the Prioritized scheme embodiment. The process of FIG. 3A first performs initialization by defining a priority and a timestamp for each BS (101). The process computes and sends out $\overline{INSR}_{bjc}$ (and $w_j$, $ISR_{sbjc}$ if it is the first iteration) (102). Next, the process checks if no two-hop neighbor has a smaller timestamp or the same timestamp but higher priority (103). If so, the process runs the remaining part of the iteration (decides new status, update in-neighbors and out-neighbors) and then increments the timestamp (104). In 103, if there are neighbors that meet the condition in 103, the process waits for the next iteration (105) and loops back to 102.

In FIG. 3A, the timestamp is initially all set to 0 and the priority can be either randomly generated or based on some system parameters such as total queue length or total received throughput in each cell. In each iteration, a BS b checks its two-hop neighbors. If any two-hop neighbor either has a smaller timestamp or the same timestamp but higher priority, BS b does not change its status. Otherwise, the BS b updates its status according to the basic scheme, and increments its timestamp and reports the new timestamp to its two-hop neighbors.

Figure 3B:
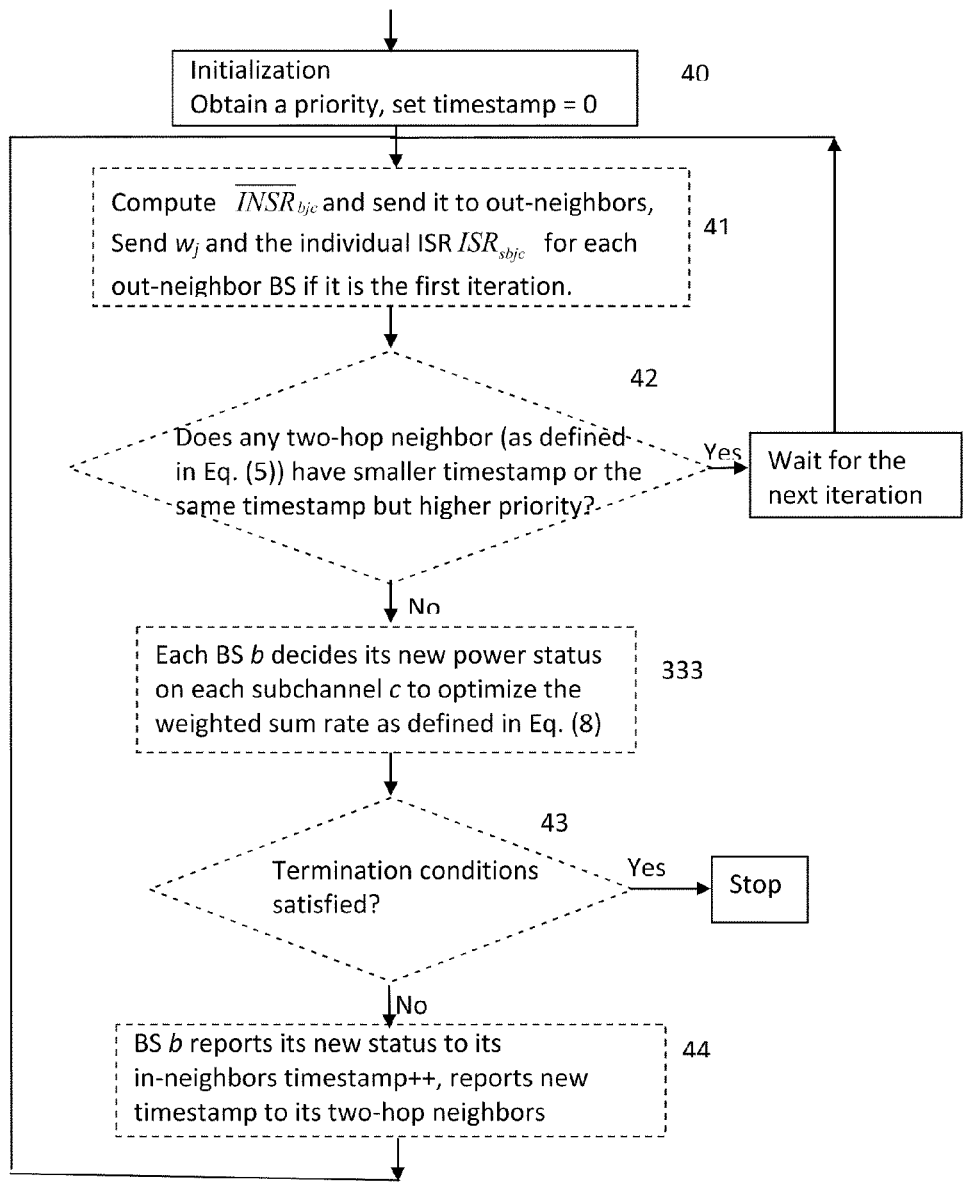

FIG. 3B shows another implementation of the prioritized scheme. In this implementation, the initialization of the process (40) is similar to block 332 of FIG. 2, with the addition that the priority and the timestamp are defined for each BS. Next, in block 41, each BS b computes $\overline{INSR}_{b,j(b,f)f}$ and sends to out-neighbors. If this is the first iteration, BS b also sends $w_j$ and the individual ISR $ISR_{s,b,j(b,c),c}$ for each out-neighbor BS s. The process then checks whether any two-hop neighbors have a smaller timestamp or the same timestamp but higher priority (block 42). If so, the process waits for the next iteration and loops back to block 41. Alternatively, f no such two-hop neighbor exists, each BS b decides its new status on each subchannel c to maximize the weighted sum rates in Eq. (8) (block 333). The termination conditions are checked in block 43 and if satisfied, the process stops. Unless the stopping conditions are satisfied, BS b reports its new power status to its in-neighbors, increments its timestamp, and reports the new timestamp to the two-hop neighbors (block 44).

The Prioritized scheme converges (terminates) within finite steps. There are several special cases (or variants) that satisfy the requirement in the Prioritized scheme. For example, if the base station status is updated sequentially (i.e., at most one BS may update its status at each iteration), or if any two BSs that are two-hop neighbors cannot change their status simultaneously, the process converges. A simple variant that converges within finite steps is the following. Each BS computes its new status to maximize the weighted sum-rates. All BSs that are two-hop neighbors exchange the respective (possibly quantized) gains in the weighted system rate that can be obtained if they are allowed to update. Only the BS with the highest respective gain is allowed to update and ties are broken using any pre-determined rule such as allowing the BS with the lowest index or highest priority to update.

Figure 4A:
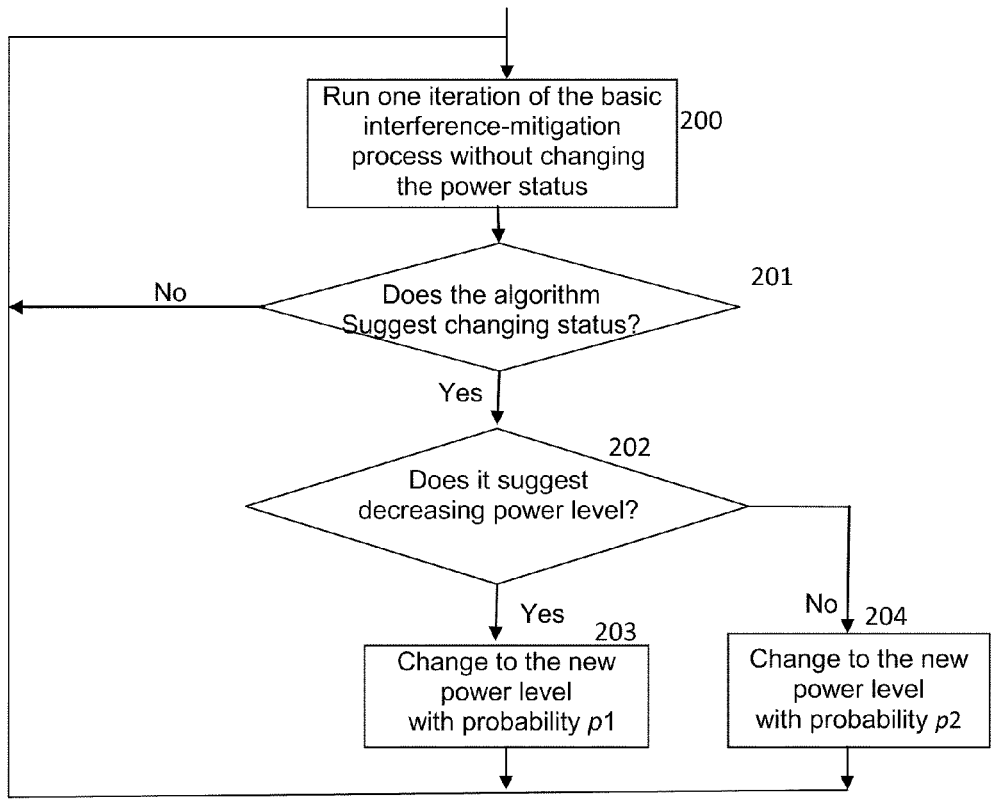
FIGS. 4A-4B shows exemplary processes for performing Randomized interference mitigation.

In another approach, the issue of concurrent update is resolved using a probabilistic approach. This scheme is the Randomized scheme embodiment. FIG. 4A shows one implementation of the randomized scheme. At each iteration, each BS runs the interference mitigation process without changing its activity status (200). The process checks if changing status is needed (201). If the interference-mitigation process suggests decreasing the power level on subchannel c, the BS will change its power level on that subchannel with probability $p_1>0$ (203). Instead, if the process suggests increasing the power level on subchannel c, then the BS will change its power level with probability $p_2>0$ (204). Otherwise, the base station maintains the previous state.

In one variant, $p_1$ and $p_2$ may depend on the respective gain in the weighted sum rates if the power level of a BS is updated. In fact, a finite table of probability values versus gain value range that each BS can use can be computed and this table can be BS and sub-channel dependent.

Figure 4B:
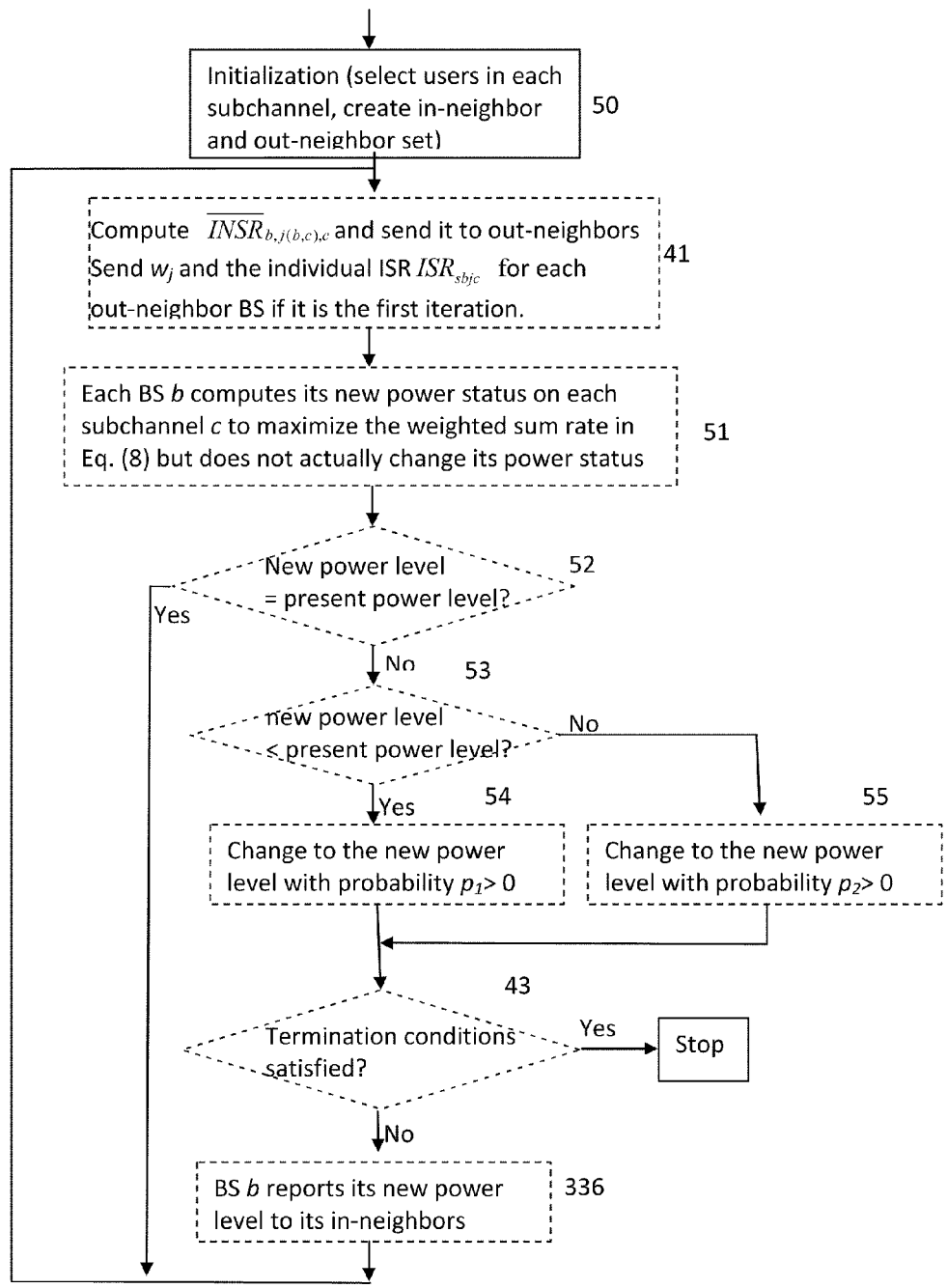

FIG. 4B shows a flow-chart of another implementation of the Randomized distributed interference mitigation process. In block 50, the process performs initialization (i.e., select users in each subchannel, create in-neighbor and out-neighbor set). The next step is the same as the Block 41 in FIG. 3B. Each BS b computes $\overline{INSR}_{b,j(b,c),c}$ and sends it to out-neighbors. If this is the first iteration, BS b also sends $w_j$ and the individual ISR $ISR_{s,b,j,c}$ for each out-neighbor BS s. In block 51, each BS b computes its new power status on each sub-channel c to maximize the weighted sum rate in Eq. (8), but the BS does not actually change its status. Each BS b then checks whether the new power level differs from the old one in block 52. If so, it further checks whether the new power level is lower than the present one in block 53. If so, the BS changes to the new power level with probability $p_1>0$ and if not, the BS changes to the new power level with probability $p_2>0$. Then each BS determines whether the terminating conditions are satisfied (block 43). If so, the process exits. Alternatively, he BS b reports its new status to its in-neighbors in block 336 and the process loops back to block 41 to continue.

An exemplary pseudo-code for the process of FIG. 4B is as follows:

---

Randomized interference mitigation scheme:

Each BS first selects the user on each subchannel to maximize weighted data rate and then in each iteration, each BS updates its power on each subchannel as if neighboring BSs' transmission power is fixed.
Initialization:

Each BS b selects the user (block 50) on each subchannel that has the maximum weighted data rate $w_j r_j$ where the user rate $r_j$ is defined by $r = \log_2(1 + SINR/\Gamma)$, computes its out-neighbor set on each subchannel and sends to each out-neighbor BS the following information on each subchannel c (block 41):
a) its total modiefied INSR $\overline{INSR}_{b,j,c}$ on the subchannel c,
b) the individual ISR $ISR_{s,b,j,c}$ for each out-neighbor BS s.
c) The weight $w_j$ of the selected user on subchannel c.
When a BS receives messages from neighboring BSs, it can construct its in-neighbor set $NB_{in}(b, c)$ on each subchannel.
Iteration: Each iteration includes three steps.

i) Each BS b computes its optimal power to maximize the weighted sum rate $T_{b,c}$ of itself and its in-neighbors on subchannel c (block 51) assuming that neighboring BSs do not change their transmission power:

$$T_{b,c} = w_{j(b,c)} \bar{r}_{b,j(b,c),c} + \sum_{s \in NB\_in(b,c)} w_{j(s,c)} \bar{r}_{s,j(s,c),c}$$

Let $T_{b,c}$ be the optimal value (where the transmission power is chosen from the subset of allowed transmission power for BS b on subchannel c) and $T_{b,c}^0$ be the value with the current power level. If $T_{b,c} > (1 + \Delta) T_{b,c}^0$, BS b changes its transmission power on subchannel c to the optimal power level with a probability p. This probability p may depend on whether the transmission power is increased or decreased. If the optimal power is less than the current power, we change the power level to the optimal value with probability $p_1$ and otherwise change the power with probability $p_2$.
ii) Each BS notifies its in-neighbors about its new transmission power on each subchannel if updated.
iii) When a BS receives the new transmission power from its out-neighbors, it re-computes its total modified INSR $\overline{INSR}_{b,j,c}$ and sends back to its out-neighbors.

---

In the Randomized scheme, multiple BSs can simultaneously change their status at each iteration, and there is a non-zero probability that they all switch off on a given subchannel. The value of the objective function (3) is not guaranteed to be non-decreasing at each iteration. Nonetheless, the Randomized scheme will converge with probability 1 to a terminating state, which is a state where changing the activity status of any single BS cannot improve the weighted sum of modified rates.

In the aforementioned basic Randomized or Prioritized scheme, the user on each subchannel of each cell is selected assuming that all other cells are active and is fixed during the execution of the interference mitigation process. Two possible enhancements can be done where the user selection is updated during the execution of the interference mitigation process:

A) The user on each subchannel is re-selected after each iteration of the basic process.
B) The user on each subchannel is re-selected after the randomized/prioritized process converges.

Each enhancement can be applied to both Prioritized and Randomized schemes. In all cases, users are re-selected to improve the modified rate in each cell and user re-selection does not affect the rate calculation in other cells. In both enhancements, it is best to fix the out-neighbor sets and in-neighbor sets (e.g., based on average power and interference levels). In this case, since the user re-selection monotonically improves the system weighted modified rate, the above enhancements do not affect the convergence of the process.

Figures 5A, 5B:
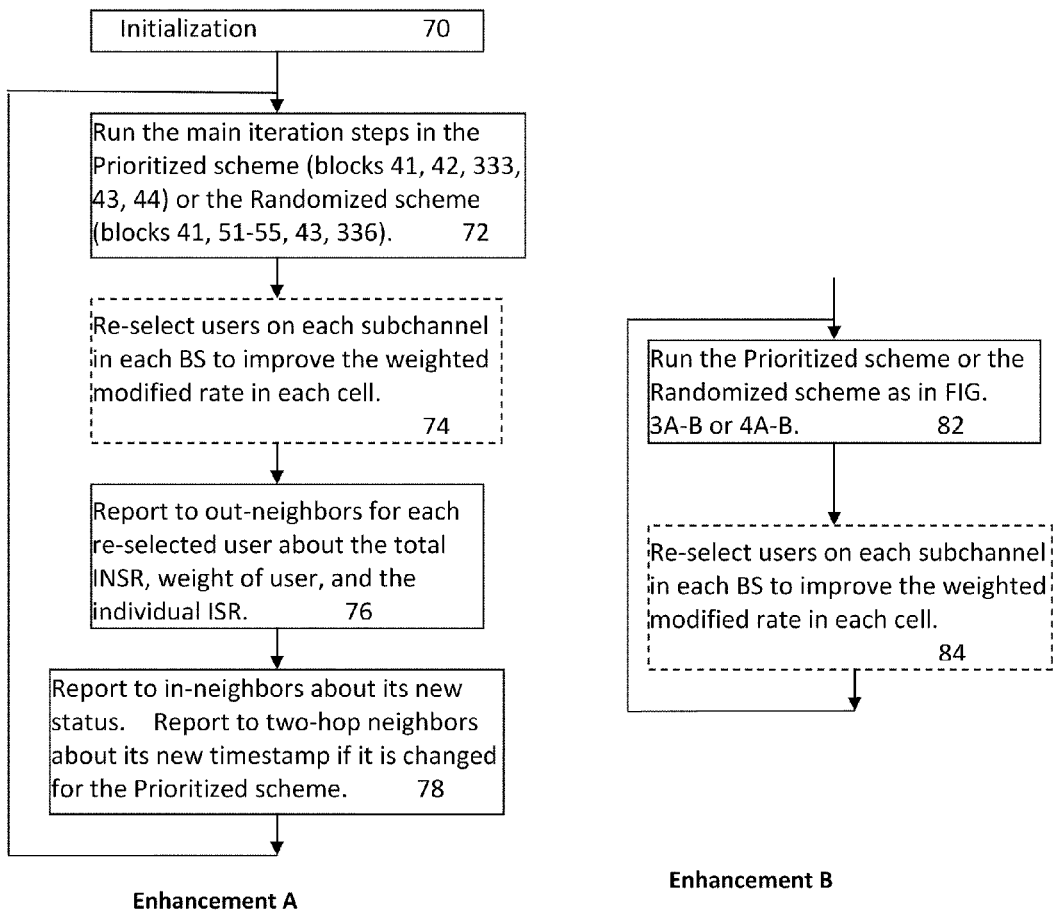
FIG. 5A-5B shows exemplary flow-charts of enhancements A and B to the embodiments of FIGS. 3A-3B and FIGS. 4A-4B, respectively.

FIG. 5A and FIG. 5B show exemplary flow-charts of Enhancements A and B to the embodiments of FIGS. 3A-3B and FIGS. 4A-4B, respectively. In either enhancement, initialization is done (block 70). Next, in block 72, the system executes the main iteration section in the Prioritized scheme (blocks 41, 42, 333, 43, 44) or the Randomized scheme (blocks 41, 51-55, 43, 336).

For enhancement A, the process of FIG. 5A re-selects users on each subchannel in each BS to improve the weighted modified rate in each cell (block 74). The process then reports to out-neighbors for each re-selected user about the total INSR, weight of user, and the individual ISR (block 76).

Alternatively, for enhancement B, the process of FIG. 5B executes the Prioritized scheme or the Randomized scheme as in FIG. 3A-B or 4A-B in block 82. Next, in block 84, the enhancement B re-selects users on each subchannel in each BS to improve the weighted modified rate in each cell.

When the user is changed on a subchannel of a cell, the set of out-neighbors on that subchannel in the cell is updated and need to be informed. Thus, for either enhancement, the processes of FIGS. 5A and 5B report to in-neighbors about its new power status (block 78). For the Prioritized scheme, the new timestamp is sent to two-hop neighbors if it is changed. Therefore, the above enhanced scheme A requires more communication overhead than the enhanced scheme B. However, enhancement B takes longer time to converge.

In all the aforementioned processes, the BS can have multiple power levels on each subchannel. A special case is binary power control, in which the BS can only be either on or off in each subchannel. The procedures for the binary power control are identical except that the there are only two possible power levels to pick. Namely, $\chi_{bc}$=0 or 1. The procedure for binary power control is discussed in Provisional Application 61/079,489 filed Jul. 10, 2008, the content of which is incorporated by reference.

Figure 5C:
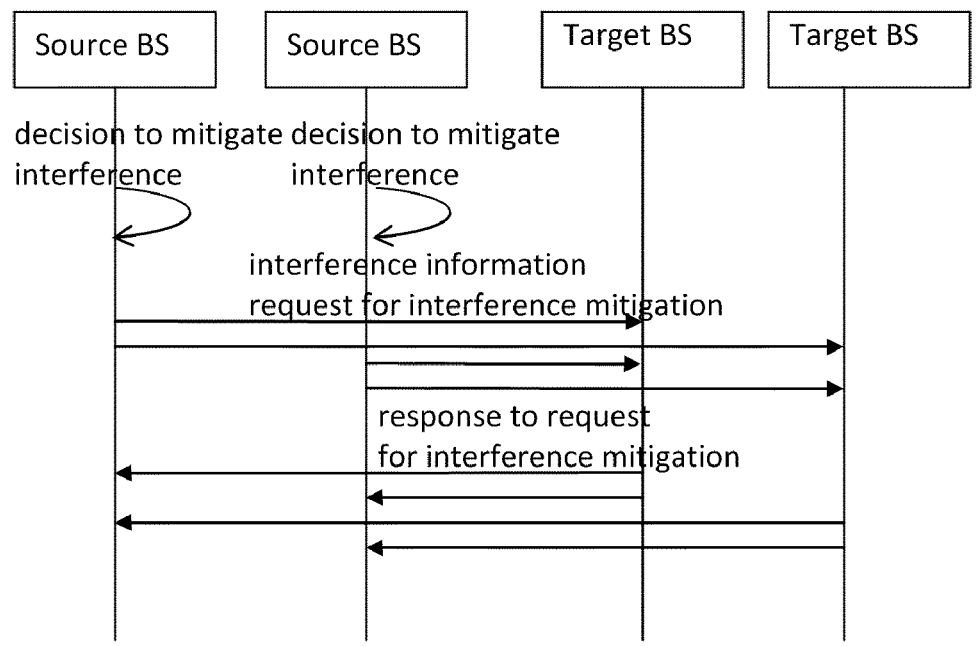
FIG. 5C shows various embodiments to perform interference mitigation.

FIG. 5C shows various embodiments to perform interference mitigation. In one variation, BSs can perform interference mitigation using average channel conditions and interference levels rather than instantaneous ones. In another variation, not all BSs need to actively perform interference mitigation at all time. Instead, each BS (called source BS) can continuously monitor its own interference situation, decide to mitigate interference, and then collect interference information and related parameters from the MSs and the neighbor cells. Then the source BS decides which neighbor BSs are the out-neighbor BSs and sends them necessary information to compute the weighted rate at the source BS if changing their interference parameters (i.e., power levels). The out-neighbor BSs are the set of BSs that may need to control their power, and are thus called target BSs. Each target BS decides whether to change its power settings based on the procedures described in this document and sends back the response to the source BSs.

Figure 6:
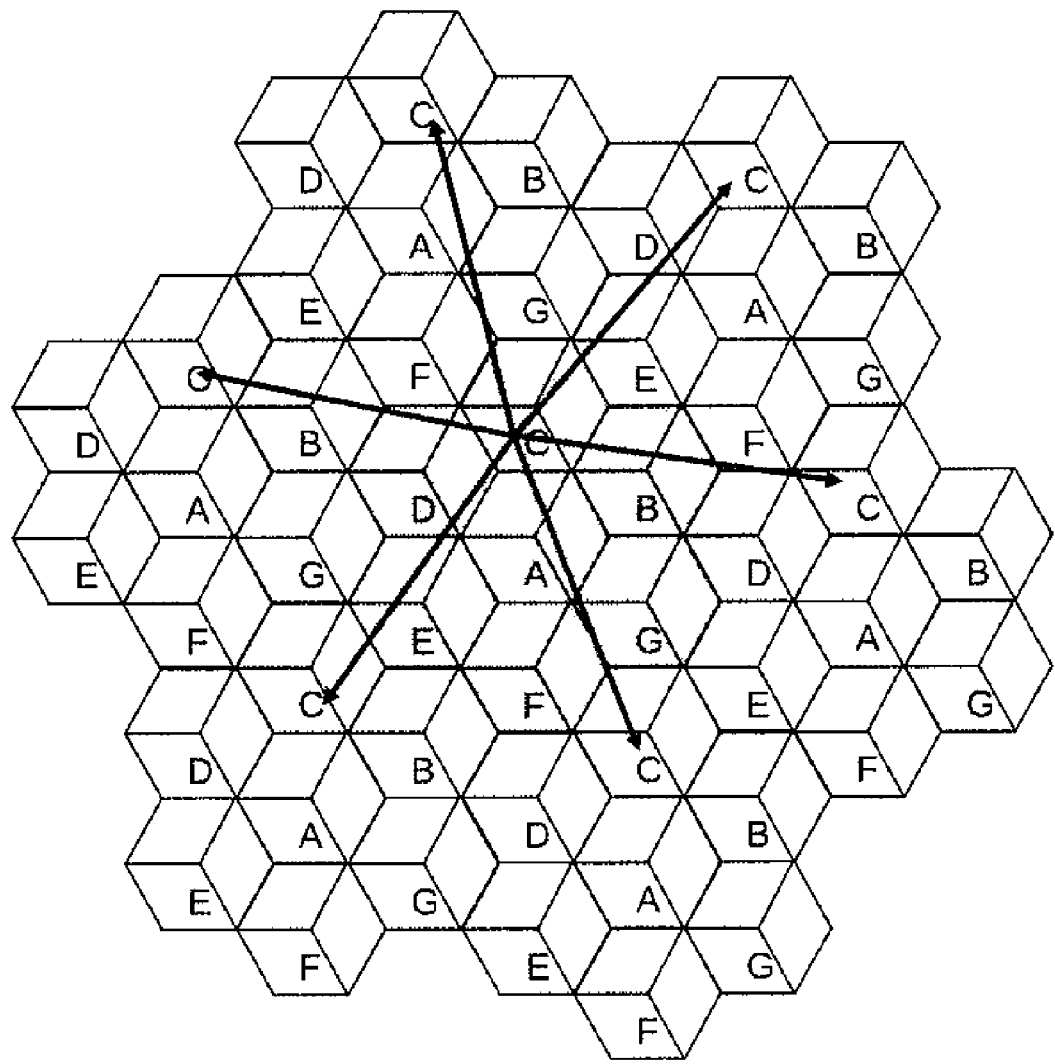
FIG. 6 shows an exemplary 7-cell network which is simulated to provide a performance comparison.

The performance of the interference mitigation strategies has been tested through Monte-carlo simulations. A 7-cell network is simulated, as shown in FIG. 6. Each cell has three sectors. The cell radius is set to 1000 meters and mobile devices are dropped uniformly in the circle covering the shaded area but at least 50 meters away from any BS. Wrap-around topology is used. Thus, any mobile receives signals from the nearest 7 image cells. In FIG. 6, the 7 grey cells are simulated and wraparound is assumed. The arrows show the 6 image cells of a shaded cell C. Simulations are based on the 802.16m evaluation methodology document for A 10 MHz channel bandwidth but only 30 subchannels are simulated. The main system parameters are summarized in Table 1.

TABLE 1

| System parameters | |
|---|---|
| Number of BS | 7 |
| Number of sectors in each BS | 3 |
| Number of subcarriers (C) | 30 |
| Number of users (N) | 100 |
| Transmit power | 46 dBm |
| Noise power spectrum density | −174 dBm/Hz |
| Channel bandwidth | 10 MHz |
| BS antenna gain | 17 dB |
| MS antenna gain | 0 dB |
| cable loss | 2 dB |
| Penetration loss | 10 dB |
| Noise figure | 5 dB |

The BS-to-user channel undergoes pathloss, shadow fading and fast fading. The long-term channel gain from BS/sector i to user j is modeled as $$g_{ij} = G_0 \cdot \frac{s_{ij}}{L_{ij} \cdot A_{ij}(\theta)}, \tag{19}$$

where the pathloss model $L_{ij}$ (in dB) used for the simulation is $$L(d) = 36.2 + 35 \log_{10} d, \tag{20}$$

where d is the distance between the BS and the user. The radiation pattern $A(\theta)$ (in dB) of the antenna in each sector is $$A(\theta) = \min\left(12\left(\frac{\theta}{\theta_{3\,dB}}\right)^2, A_m\right), \tag{21}$$

where $\theta_{3dB}$=70° is the 3 dB beamwidth and $A_m$=20 dB is the maximum attenuation. The effect of shadowing $S_{ij}$ is modeled as a log-normal distribution with standard deviation of 8 dB and inter-BS correlation coefficient of 0.5. $G_0$ captures the combined gain of the BS/MS antenna gain, the noise figure, cable loss, and penetration loss. $G_0$ s set to 0 dB in the simulations.

The maximum Doppler spread of the fast fading component is assumed to be 10 Hz for all users. The six-path ITU Pedestrian B model is used; the path delay and the power delay profile are given by Delay(ns)=[0 200 800 1200 2300 3700]

Power (dB)=[−3.9 −4.8 −8.8 −11.9 −11.7 −27.7].

The user weight in each iteration is based the proportional fairness scheduling, which is the inverse of the exponential moving average of the achieved sum-rates on all subchannels. Unless specified, other parameters are set as follows: $\Gamma=1$, $K=6$ and $\beta=0.01$ (i.e., −20 dB). The simulation results presented here is only for binary power control (i.e., the power status on each subchannel can be only either on or off). Better performance is expected with multiple power levels.

All simulations are executed for 1000 time slots and 10 simulation runs are executed with different random seeds in each run. The throughput reported is the time averaged user throughput divided by the number of subchannels in the system. The throughput reported is calculated based on Eq. (1) and (3), and each BS computes the modified user rates based on Eq. (7).

In the first part of the simulations, the users in each cell are selected at the beginning of each time slot assuming that all cells are active and the user selection is fixed during the same time slot.

Figure 7:
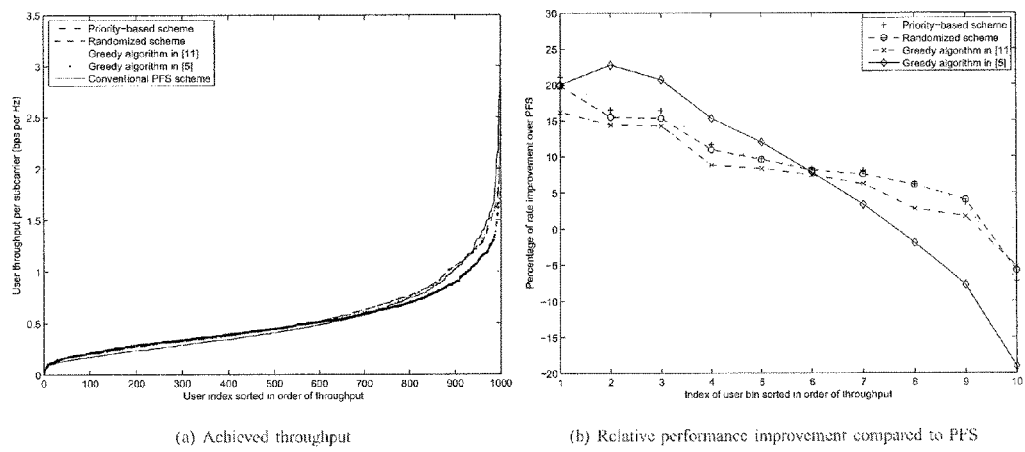
FIG. 7 shows exemplary plots of achieved throughput and relative performance improvements for the average rate.

FIG. 7A shows the achieved average user rate for the proposed Prioritized and Randomized distributed schemes and for the references strategies. For clarity, users are sorted in the order of the throughput they receive: with 100 users in each run and 10 simulation runs, 1000 data points are generated. Since the performance improvement of the other schemes over the conventional PFS scheme is not clear, the 1000 data points are divided into 100-point bins in the order of their throughput: the k-th bin contains the data points from the $(100(k-1)+1)^{th}$ to the $(100 k)^{th}$ highest throughput.

FIG. 7B shows a plot of the percentage of the average rate improvement of the other three schemes over the PFS scheme. As shown in FIG. 7B, for about 30% of users (which are mostly cell-edge users) the average throughput improves by 15-20%; for more than 80% of users, the average throughput improves by over 5%. This comes at the price of no more than 5% throughput drop for the top 10% users that receive the highest throughput. The system's distributed processes slightly outperform the centralized scheme. The greedy centralized process provides the best throughput for cell-edge users, but worst throughput for inner users.

Figure 8:
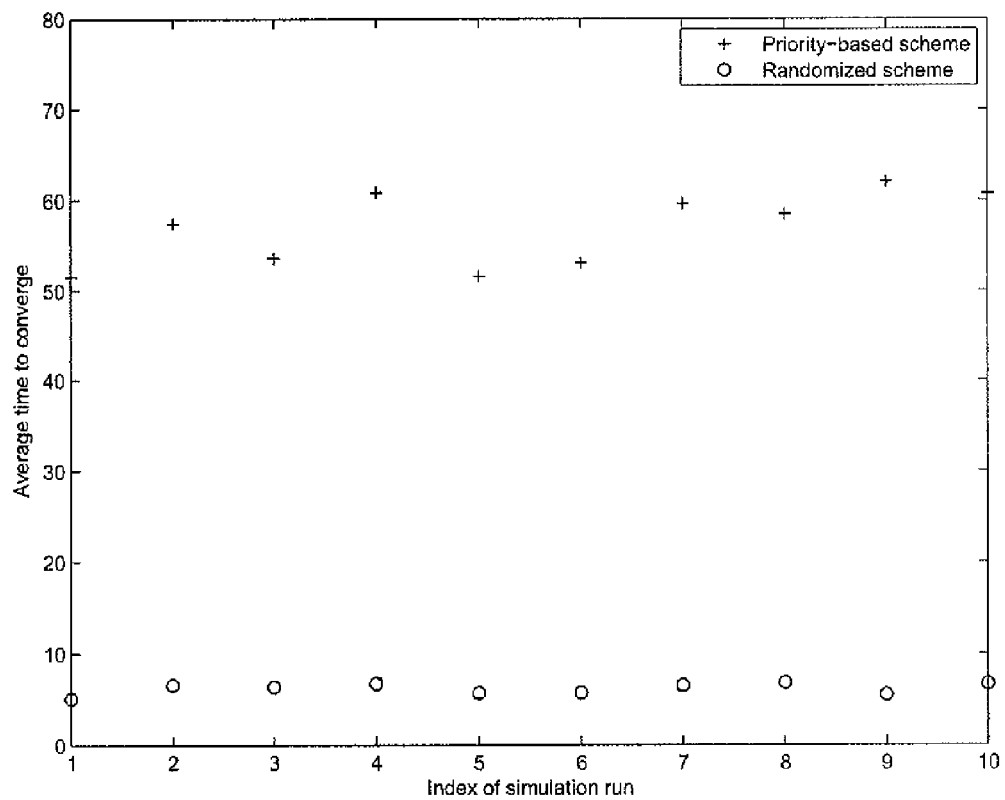
FIG. 8 shows the average convergence time of the Randomized scheme and the Prioritized scheme.

The convergence of the proposed distributed process is analyzed next. FIG. 8 shows the number of iterations required to achieve convergence at each run. As expected, the Prioritized process requires a larger number of iterations to converge, since only a limited number of BSs update their status at each iteration. Instead, the Randomized scheme takes on the average only 6 iterations to converge.

Figure 9:
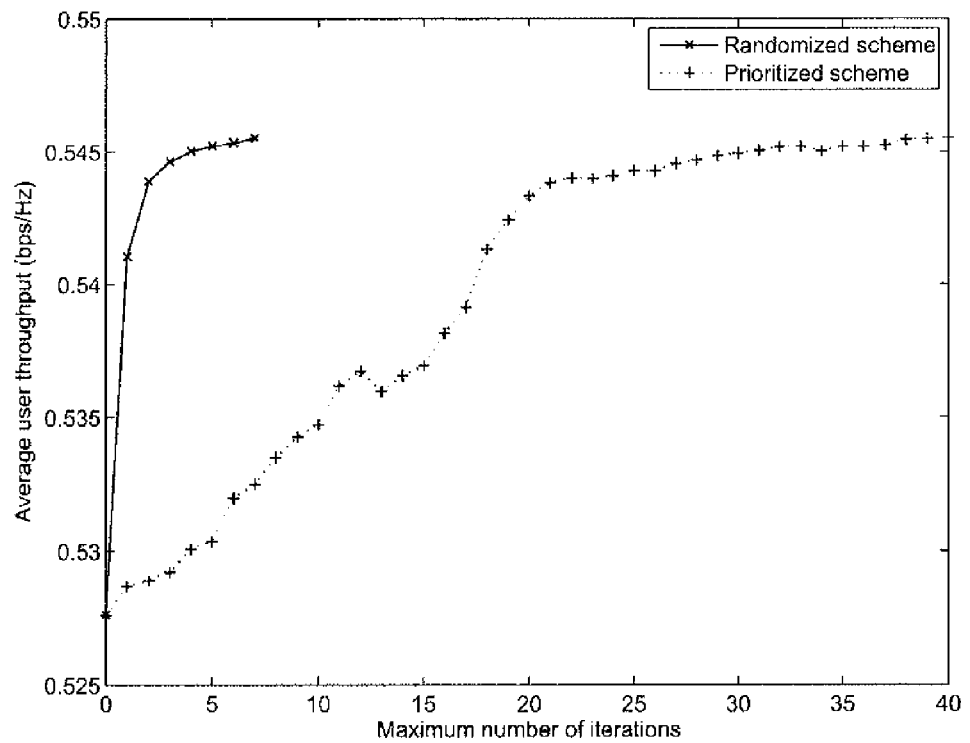
FIG. 9 shows the average user rate achieved in each iteration of the Randomized scheme and the Prioritized scheme.

Next, a throughput analysis is done for the Randomized scheme and the Prioritized scheme stopped after a maximum number of iterations is executed. FIG. 9 shows the average user throughput as the maximum number of iterations increases for each scheme. Remarkably, the Randomized process achieves most of the throughput improvement with only two iterations.

Figure 10:
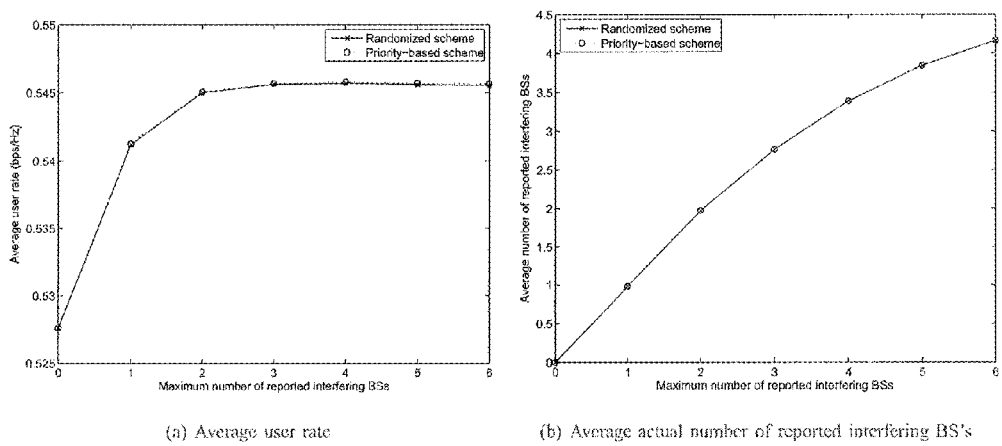
FIG. 10 shows an exemplary plot of average user rate and actual number of reported interfering BSs vs. maximum number of reported interfering BSs.

In both the Prioritized and the Randomized scheme, each BS reports at most K strongest interfering BSs in each subchannel. FIG. 10 shows how the value of K affects the overall performance while setting $\beta=0.01$. As the maximum number of reported interfering BSs increases, the average actual number of reported interfering BSs (and thus the communication overhead) and the average user throughput both increase. However, remarkably, reporting the two most significant interfering BSs is already sufficient to achieve most of the rate gain.

Figure 11:
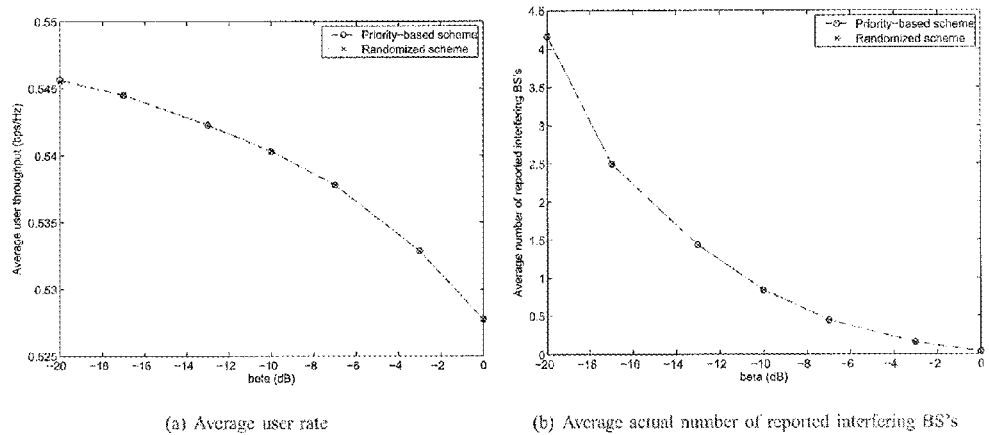
FIG. 11 shows an exemplary plot of average user rate and actual number of reported interfering BSs vs. the value β.

In both the Prioritized and the Randomized schemes, each BS only reports an interfering BS if the ratio of the interfering BSs signal to the serving BSs signal is greater than a threshold $\beta$. The following discussion shows how the threshold $\beta$ affects the average user throughput while the maximum number of reported interfering BSs K is set to 6. FIG. 11 shows the tradeoff between the user throughput and the value $\beta$. With a decreasing value $\beta$, the average number of reported interfering BSs (the overhead) increases while the average user throughput also increases. But further reducing $\beta$ beyond −20 dB from the signal value has limited improvement of the user throughput.

Figure 12:
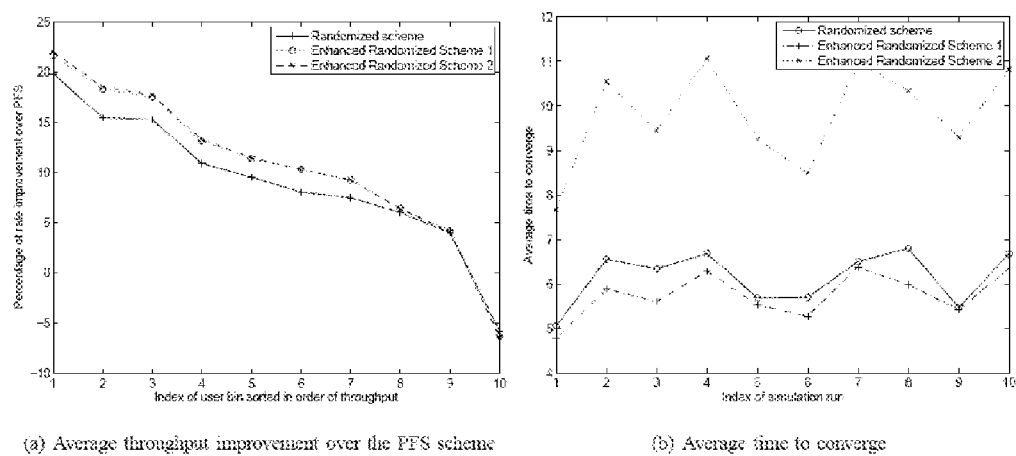
FIG. 12 shows an exemplary plot of average throughput and convergence time of the enhanced schemes.

The benefits of the enhanced schemes are discussed next where the users are re-selected during the process execution. Because the Randomized scheme achieves almost exactly the same throughput as the Prioritized scheme but converges much faster, only the enhanced Randomized scheme is considered. Similar to FIG. 7B, the data points of time-average user throughput are sorted and grouped into 10 bins to show the average throughput improvement over PFS in FIG. 12. It can be seen that both enhanced schemes further improve the cell-edge user throughput by an additional 2-4%. However, the enhanced scheme 2 takes much longer time to converge than the basic Randomized scheme and the enhanced scheme 1. The enhanced scheme 1 achieves the shortest convergence time because an improved user selection makes the system closer to the terminating states.

The foregoing system provides inter-cell interference mitigation via coordinated power control in wireless cellular data networks. Two iterative distributed processes can be used to maximize the network weighted sum-rate. The schemes converge to a state where no single BS can change its status to improve the weighted throughput. Simulation results indicate that the proposed process improve the global system throughput by about 5% and the throughput of cell-edge users by almost 20%.

What is claimed is:

1. A method for transmission with a plurality of base stations (BSs) in a wireless cellular data network where one BS communicates with neighboring BSs, comprising:
   a) determining a binary or a discrete new power level on each subchannel to maximize a weighted sum modified rate of a BS and in-neighbor BSs, said weighted sum modified rates comprising a summation of weighted modified rates of a first BS and in-neighbor BSs; and
   b) resolving a concurrent power update in a distributed manner with each BS.

2. The method of claim 1, wherein resolving the concurrent power update comprises using a prioritized method or the randomized method.

3. The method of claim 1, wherein the in-neighbor BSs comprise a subset of neighboring BSs strongly interfered by the current BS and wherein the in-neighbor BSs are determined statically or dynamically in each iteration.

4. The method of claim 1, comprising preventing two neighboring BSs from updating activity status at the same time.

5. The method of claim 1, wherein the BSs comprise two-hop neighbors.

6. The method of claim 5, comprising retaining a BS status if a two-hop neighbor either has a smaller timestamp or an equal timestamp at a higher priority and otherwise updating the base station status and reporting a new timestamp to the two-hop neighbors.

7. The method of claim 5, comprising retaining the BS status if a two-hop neighbor offers a larger gain if allowed to update its status and otherwise updating the base station status.

8. The method of claim 1, wherein each BS selects a user on each subchannel to maximize weighted data rate and then in each iteration, each BS updates its power on each subchannel as if a neighboring BS's transmission power is fixed.

9. The method of claim 1, comprising:
   a. determining an optimal power to maximize a weighted sum rate for the base station and in-neighbors on a subchannel;
   b. notifying in-neighbors of the base station's new transmission power on each subchannel if updated;
   c. upon receiving the new transmission power from out-neighbors, updating a total modified INSR and sending the total modified INSR to out-neighbors.

10. The method of claim 1, comprising
    a. changing the power of a BS on a subchannel with probability $p_1 > 0$ when a calculated new power level is lower than the present power level;
    b. changing the power of a BS on a subchannel with probability $p_2$; $>0$ when the calculated new power level is higher than the present power level; and
    c. otherwise, maintaining the BS's present power level.

11. The method of claim 10, wherein the probability $p_1$ and $p_2$ are fixed.

12. The method of claim 10, wherein the probability $p_1$ and $p_2$ depend on the respective gain in the weighted sum rates if the power level of a BS is updated.

13. The method of claim 1, wherein users in each cell are selected at a first iteration and remain fixed during interference mitigation.

14. The method of claim 1, comprising selecting users to improve modified rates in each cell at the end of each iteration.

15. The method of claim 1, comprising determining a set of out-neighbors/in-neighbors based on average channel quality.

16. The method of claim 1, comprising selecting users on each subchannel in each cell after convergence of the prioritized scheme or the randomized scheme.

17. The method of claim 1, wherein the BS performs interference mitigation using average channel conditions and interference levels.

18. The method of claim 1, wherein the BS performs interference mitigation using instantaneous channel conditions and interference levels.

19. The method of claim 1, wherein a subset of BSs perform interference mitigation.

20. The method of claim 1, wherein each BS (source BS) continuously monitors its own interference situation, mitigates the interference, and collects interference information parameters from one or more mobile stations (BSs) and one or more neighbor cells.

21. The method of claim 20, wherein the source BS decides which neighbor BSs are out-neighbor BSs and sends information to compute a weighted rate at the source BS if the out-neighbor BSs changes interference parameters or power levels.

22. The method of claim 20, wherein the out-neighbor BSs comprise a set of BSs that need to control power.

23. A method for transmission with a plurality of base stations (BSs) in a wireless cellular data network where one BS communicates with neighboring BSs, comprising:
    a) determining a binary power level on each subchannel to maximize a weighted sum modified rate of a BS and in-neighbor BSs; and
    b) resolving a concurrent power update in a distributed manner with each BS;
    wherein each BS only re-computes a modified total INSR based on new status of its out-neighbors and sends the modified total INSR to its out-neighbors via multicast.

24. The method of claim 23, wherein each BS selects a user on each subchannel with a maximum weighted data rate $w_j r_j$ and sends information to each out-neighbor BS.

25. The method of claim 24, wherein the information comprises a total Interference and Noise to Signal Ratio (INSR) on a subchannel, an individual ISR for each out-neighbor BS, and a weight $w_j$ of the user on the subchannel.

26. The method of claim 23, wherein each BS determines its new power status (on or off) to maximize the weighted sum modified rates of itself and its in-neighbor BSs.

27. The method of claim 26, wherein each BS sends a new status to in-neighbors.

28. The method of claim 23, comprising:
    a. for an initial iteration, determining a user on each subchannel, and a total modified Interference and Noise to Signal Ratio (INSR), and notifying out-neighbors about the weight of the user, the total modified ISNR and the individual ISR; and
    b. for each subsequent iteration, determining a total modified Interference and Noise to Signal Ratio (INSR)based on the new status of out-neighbors and sending the modified total INSR to out-neighbors via multicast; and
    c. optimizing a network weighted sum-rate through cooperative binary power control.

* * * * *